Dec. 10, 1968 R. GRAMINS 3,414,914
LITTER AND METHOD FOR MAKING THE SAME
Filed March 13, 1967 2 Sheets-Sheet 1

Inventor
Robert Gramins
By Thomas F. Kirby
Attorney

Dec. 10, 1968   R. GRAMINS   3,414,914
LITTER AND METHOD FOR MAKING THE SAME
Filed March 13, 1967   2 Sheets-Sheet 2
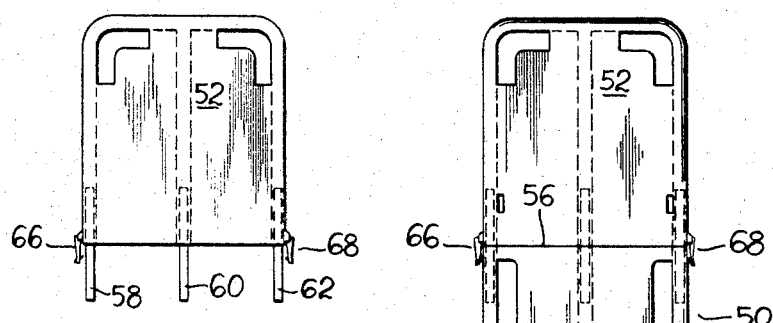
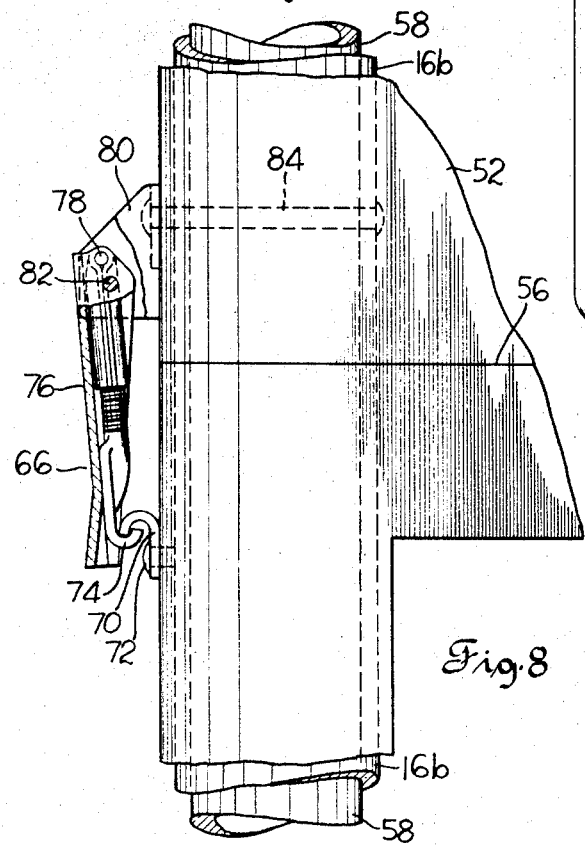

3,414,914
LITTER AND METHOD FOR MAKING THE SAME
Robert Gramins, 3346 S. 92nd St., Apt. 4, Milwaukee, Wis. 53227
Filed Mar. 13, 1967, Ser. No. 622,676
9 Claims. (Cl. 5—82)

ABSTRACT OF THE DISCLOSURE

A litter is made by coating a mold with liquid plastic which dries to a smooth finish; laying in a first layer of nonwoven glass fiber material such as a Fiberglas (trademark) mat and coating the first layer with liquid resin; laying in a second layer of woven glass fiber material such as a Fiberglas mat and coating the second layer with liquid resin; laying a rigid supporting framework of wood, metal, or stiff foam type plastic; and laying in a third layer and fourth layer of glass fiber material similar to the aforementioned first layer. The layers of material are provided with appropriate holes near their outer edges to provide handhold and strap fastening means. In another embodiment of the invention, the litter comprises two separable portions which can be locked together to provide a full-length litter or, if desired, the portions can be separated to provide a smaller litter.

Summary of the invention

This invention relates generally to litters for carrying human patients and to methods for making the same. More specifically, the invention relates to litters made of layers of resin-impregnated fabric, such as glass fiber material or Fiberglas, between which layers a rigid supporting frame is entrapped.

Prior art litters have been made of canvas, wood, sheet metal and single sheets of cured synthetic resins reinforced with glass fiber materials and have served their intended purpose to greater or lesser degrees. However, some prior art litters were not easily cleaned of stains and dirt and some were subject to mildew and deterioration because of the materials of which they were made.

It is an object of the present invention to provide an improved litter made of layers of glass fiber material impregnated with synthetic resin and having a rigid supporting framework entrapped between the layers of Fiberglas material.

Another object is to provide an improved method for making a litter of the aforesaid character.

Another and more specific object is to provide a litter of the aforesaid character which has an extremely smooth moisture impervious and easily cleaned upper surface; which is extremely strong and yet lightweight; which is easily stored and takes up little space in motor vehicles, airplanes and ships; which floats if accidentally dropped in a body of water; which is relatively easy and economical to fabricate; and which, in one embodiment, is partially demountable to permit its use in relatively cramped quarters.

Another object is to provide several embodiments of the invention, one of which comprises two separable portions which can be locked together to provide a full-length litter or, if desired, can be unlocked to permit one section to be removed.

Other objects and advantages of the invention will hereinafter appear.

Description of the drawings

The accompanying drawings illustrate two preferred embodiments of the invention but it is to be understood that the embodiments illustrated are susceptible of modifications with respect to details thereof without departing from the scope of the appended claims.

In the drawings:

FIG. 6 is a top plan view of another embodiment of a litter in accordance with the present invention;

FIG. 7 is a top plan view of one portion of the litter shown in FIG. 6, showing that portion disconnected from the other portion of the litter; and FIG. 8 is an enlarged view of the locking mechanism employed with the embodiment shown in FIGS. 6 and 7.

Detailed description of the invention

Figures 1, 2, 3:
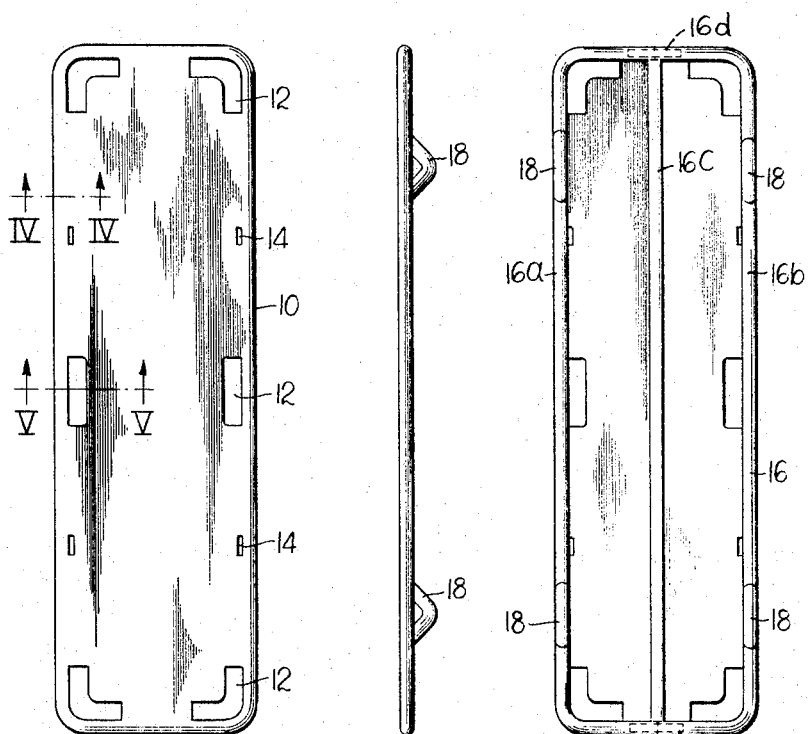
FIG. 1 is a top plan view of one embodiment of a litter in accordance with the present invention.
FIG. 2 is a side elevational view of the litter of FIG. 1.
FIG. 3 is a bottom plan view of the litter of FIGS. 1 and 2.

Referring to FIGS. 1, 2 and 3 of the drawings, the numeral 10 designates one embodiment of a litter in accordance with the present invention. Litter 10 is rectangular in form and is understood to be of a size sufficient to accommodate an adult human being, for example, about 6 feet long and 2 feet wide. Litter 10 is provided at its corners and at its midsection with openings 12 for accommodating the hands of those carrying it and with openings 14 for accommodating straps (not shown) or other fastening devices employed to keep a patient from falling off the litter.

As hereinafter explained, litter 10 is made of resin-impregnated glass fiber sheets such as Fiberglas between which a rigid supporting framework 16 is entrapped. As FIG. 3 shows, the outline of the supporting framework is visible on the bottom of litter 10. FIG. 2 shows that the framework is adapted to provide supporting legs 18 for litter 10 which raise it off the ground and enable it to be more easily grasped. In practice, the legs 18 could be made of short lengths of tubing which are riveted or otherwise secured to framework 16.

Figure 4:
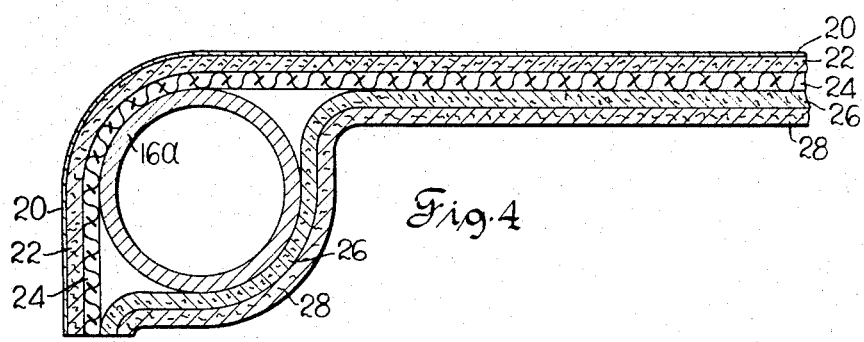
FIG. 4 is an enlarged cross-sectional view taken along the line IV—IV of FIG. 1.
Figure 5:
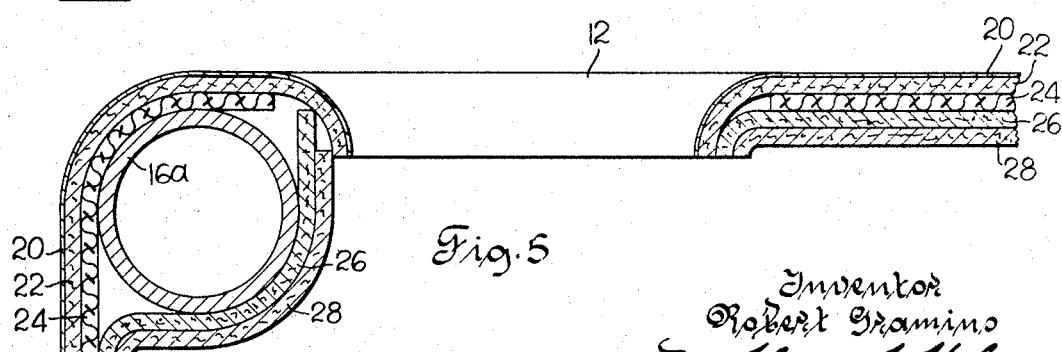
FIG. 5 is an enlarged cross-sectional view taken along the line V—V of FIG. 1.

Referring now to FIGS. 4 and 5, it is seen that litter 10 is comprised of a plurality of layers or sheets of material between which framework 16 is entrapped. More specifically, litter 10 comprises a smooth upper surface formed by a thin layer 20 of liquid plastic resin. In practice, layer 20 may comprise any one of several types of commercially available so-called "gelcoats." For example, an isophthalic gelcoat gives a very high gloss permanent finish which is scuff and stain resistant and which can, if desired, have suitable colored pigments dispersed therein. Layer 20 may in practice be brushed on or sprayed on to the surface of a suitable mold. Layer 20 which has no strength of itself, must be backed by other materials. Layer 20 is backed by a layer 22 of liquid plastic resin-impregnated, nonwoven, felted glass fiber material. In practice, layer 22 is a commercially available mat which comprises chopped strands of glass fibers randomly disposed and held together by a binding agent. The material for layer 22 is available in a variety of widths, thicknesses and weights. Layer 22 is backed by a layer 24 of liquid plastic resin-impregnated, woven roving glass fiber material. In practice, layer 24 is a commercially available product available in a variety of widths (up to 60 inches), thicknesses (on the order of .035) and weights and which has high tensile strength. A type is used which will provide the strength needed to enable the litter to support a man's weight. Layer 24 is backed by two layers 26 and 28 of resin-impregnated, nonwoven, felted glass fiber material similar to that used in layer 22, hereinbefore described. Each layer 26 and 28 preferably comprises strips of material about 6 to 8 inches in width which easily conform to the irregular configurations of framework 16.

The resin employed in the present invention is preferably a commercially available type comprising polyesters or epoxies which are adapted for use with glass fiber materials or the like.

It is to be understood that woven and nonwoven glass fiber fabrics are employed as shown in order to obtain maximum strength at minimum cost. Specifically, the woven material such as 24 has high strength and flexibility but is more costly than the nonwoven material. However, it does not lend itself readily to the bends required around openings 12 and 14 because it tends to pleat. The nonwoven material is more in the nature of a felted material and is therefore relatively weaker than woven material. However, it does lend itself for use on compound curved surfaces and is suitable as an economical backing for the woven material.

It is to be understood that only so much liquid plastic resin should be applied to the layers of glass fiber material as is necessary to bring the materials to a full strength condition. Application of too much resin tends to make the construction brittle and susceptible to cracking or breaking and adds unnecessary weight.

Framework 16 which is entrapped between the layers 24 and 26 is preferably made of commercially available rigid, hollow metal tubing bent to suitable shape but could be made of wood or other suitable material. In practice, it is preferred that framework 16 comprise five component members 16a, 16b, 16c, 16d and 16e, as FIG. 3 shows. Components 16d and 16e are smaller tubular members which anchor components 16a and 16b together at the ends. Component 16c is contoured at its ends so as to bear tightly against the outer framework but is not otherwise mechanically secured thereto.
method.

Litter 10 is fabricated according to the following method.

A mold (not shown) having the desired contour is provided and the inside surface of the mold is brushed or sprayed with the resinous material 20 which is allowed to dry. It is to be understood that the time for air drying of the plastic resinous material in layer 20 and the other plastic resins used depends on the ambient temperature, humidity and the amount of commercially available drying agents which may be employed.

The layer 22 of material, provided with suitable openings 12 and 14, is laid in the mold adjacent layer 20 and impregnated by painting or spraying with a suitable resin.

Before impregnated layer 22 dries, the layer 24 of woven material provided with suitable openings 12 and 14 is laid in the mold adjacent layer 22 and suitably impregnated with resin. It is to be understood that the impregnated layer 22 will bond itself to layer 20. The impregnated layers 22 and 24 are allowed to air dry or cure to a point where no impressions can be made if framework 16 is laid therein.

Framework 16, assembled as hereinbefore described, is laid in the mold adjacent impregnated layer 24 after the latter dries.

The layer 26 of material, provided with suitable openings 12 and 14, is laid in the mold over framework 16 and suitably impregnated with resin.

If desired to give added strength, the layer 28, similar to layer 26, is added.

The entire assembly is allowed to dry for anywhere from one-half to one hour and is then ready to be removed from the mold. Further drying of anywhere from 24 to 48 hours is necessary to fully cure the assembly, i.e., to allow it to reach its most stable form and to allow gases formed during manufacture to be driven off. The resultant assembly is rigid, sterile, free of foreign matter and extremely strong.

FIGS. 6, 7 and 8 show another embodiment of the invention, namely, a litter 50 which comprises two detachable or separable portions 52 and 54. Litter 50 is designed for use in cramped quarters, such as narrow stairwells and hallways, where manuverability could be enhanced if the litter could be shortened by removal of a portion thereof beneath the patient's lower limbs. Removal of portion 52 presupposes that injury to the patient will not occur if his legs are permitted to hang down. It is to be understood that litter 50 employs the same basic components and is constructed in the same manner as litter 10, hereinbefore described, but differs as follows. Litter 50 is fabricated by taking a litter such as 10 and cutting it along line 56 which is located so as to provide a larger litter portion 54 upon which an adult person could be carried, provided the lower limbs extended beyond and were bent down over the end of litter section 54.

The means for removably attaching portions 52 and 54 of litter 50 comprise pin-like members 58, 60 and 62 which could take the form of short lengths of pipe which fit within the tubing of which framework 16 is made and which are rigidly secured within those portions of framework 16 associated with portion 52 of litter 50.

Latching means are provided to releasably lock portions 52 and 54 together and these means take the form of commercially available latches 66 and 68. Latch 66, best seen in FIG. 8 and understood to be identical to latch 68, comprises a stationary hook 70 rigidly secured to portion 54 by means of a threaded fastener 72. Latch 66 further comprises a movable hook 74 which is pivotally mounted on a handle 76 at point 78. Handle 76 is in turn pivotally mounted on a support 80 at a point 82. Support 80 is rigidly secured to portion 52 of litter 50 by means of a rivet 84. In practice, rivet 84 can also be the means which retains pin member 58 in tubular member 16b of framework 16.

In use, both portions 52 and 54 of litter 50 are releasably and rigidly locked together as FIG. 6 shows. To detach portion 52, it is merely necessary to release both latches 66 and 68 and draw portion 52 free, as FIG. 7 makes clear. Latch 66 is released by moving handle 76 clockwise (with respect to FIG. 8) so that the pivot point of movable hook 74 is moved over center and hook 74 disengages stationary hook 70.

The embodiments of the invention in which an exclusive property or privilege is claimed are defined as follows:

1. A litter comprising:
a surface layer of relatively smooth, moisture impervious hardened material,
at least two layers of resin impregnated fiber material bonded to each other,
one of said layers bonded to said surface layer,
and a rigid supporting framework entrapped between said two layers.

2. A litter comprising:
a surface layer of relatively smooth, moisture impervious hardened material,
a first layer of resin-impregnated, nonwoven fiber material bonded to said surface layer,
a second layer of resin-impregnated, woven fiber material bonded to said first layer,
a third layer of resin-impregnated, nonwoven fiber material bonded to said second layer,
and a rigid supporting framework entrapped between said second and third layers.

3. A litter according to claim 2 comprising a fourth layer of resin-impregnated, nonwoven fiber material bonded to said third layer.

4. A litter according to claim 2 which is provided with openings therethrough along portions of said framework and wherein said surface layer and said first layer are curved to form said openings and wherein said second layer stops short of said curves.

5. A litter comprising two releasably attached portions, each portion comprising a surface layer of relatively smooth, moisture impervious hardened material,
at least two layers of resin impregnated fiber material bonded to each other,
one of said layers bonded to said surface layer,
and a rigid supporting framework entrapped between said two layers,
and means associated with said two portions for releasably attaching said two portions together.

6. A litter according to claim 5 wherein one of said portions is substantially longer than the other and is provided with handle means at opposite ends.

7. A litter according to claim 6 wherein said means for releasably attaching said two portions together comprises at least one member mounted on the framework of one portion for association with the framework of the other portion.

8. A litter according to claim 7 having locking means having cooperative components carried by each of said portions of said litter for preventing said two portions from accidentally detaching.

9. A litter according to claim 7 wherein said framework of said two portions of said litter comprises hollow tubes and wherein said one member extends from a tube on one portion into a tube on the other portion.

References Cited
UNITED STATES PATENTS

| | | | |
|---|---|---|---|
| 3,135,972 | 6/1964 | Jakes et al. | 5—82 |
| 3,198,686 | 8/1965 | Caligari. | |
| 3,210,230 | 10/1965 | Tyhurst. | |
| 3,328,086 | 6/1967 | Johnston | 297—461 |
| 3,243,234 | 3/1966 | Fehler | 297—451 |

CASMIR A. NUNBERG, *Primary Examiner.*

U.S. Cl. X.R.

5-89